United States Patent [19]
Khan et al.

[11] Patent Number: 5,237,436
[45] Date of Patent: Aug. 17, 1993

[54] ACTIVE MATRIX ELECTRO-OPTIC DISPLAY DEVICE WITH LIGHT SHIELDING LAYER AND PROJECTION AND COLOR EMPLOYING SAME

[75] Inventors: Babar Khan, Ossining; Edward H. Stupp, Chestnut Ridge, both of N.Y.; Mali Venkatesan, Santa Clara, Calif.

[73] Assignee: North American Philips Corporation, New York, N.Y.

[21] Appl. No.: 899,154

[22] Filed: Jun. 12, 1992

Related U.S. Application Data

[63] Continuation of Ser. No. 628,304, Dec. 14, 1990, abandoned.

[51] Int. Cl.⁵ .............................................. G02F 1/13
[52] U.S. Cl. ...................................... 359/59; 359/54; 359/62
[58] Field of Search ............... 357/23.7, 4; 350/333, 350/334, 336; 359/54, 59, 62; 340/784; 257/659

[56] References Cited

U.S. PATENT DOCUMENTS

| | | |
|---|---|---|
| 4,864,390 | 9/1989 | McKechnie et al. ............... 350/345 |
| 4,904,056 | 2/1990 | Castleberry ....................... 350/333 |
| 4,909,601 | 3/1990 | Yajima et al. .................... 350/345 |

FOREIGN PATENT DOCUMENTS

| | | | |
|---|---|---|---|
| 58-159516 | 9/1983 | Japan | 350/334 |
| 59-54270 | 3/1984 | Japan | 350/334 |
| 60-207116 | 10/1985 | Japan | 350/333 |
| 61-185725 | 8/1986 | Japan | 350/334 |
| 63-6529 | 1/1988 | Japan | 350/336 |
| 63-184706 | 7/1988 | Japan | 350/339 F |
| 1-42635 | 2/1989 | Japan | 350/336 |
| 1-187531 | 7/1989 | Japan | 340/784 |
| 1-216320 | 8/1989 | Japan | 340/784 |
| 1-266512 | 10/1989 | Japan | 350/334 |

Primary Examiner—Rolf Hille
Assistant Examiner—Minhloan Tran
Attorney, Agent, or Firm—John C. Fox

[57] ABSTRACT

The thin film switch of a pixel of an active matrix liquid crystal light valve is shielded from light by adding a light shielding layer of amorphous germanium or germaniums nitride in the interpixel area surrounding the pixel electrodes. Such active matrix displays are advantageously employed in a color projection TV to produce the separate red, blue and green components of a full color display.

11 Claims, 5 Drawing Sheets

ACTIVE MATRIX ELECTRO-OPTIC DISPLAY DEVICE WITH LIGHT SHIELDING LAYER AND PROJECTION AND COLOR EMPLOYING SAME

This is a continuation of application Ser. No. 07/628,304, filed Dec. 14, 1990, now abandoned.

BACKGROUND OF THE INVENTION

This invention relates to active matrix electro-optic display devices, and more particularly relates to such devices having a light shielding layer associated with the matrix, and also relates to color projection apparatus incorporating these devices.

In one form of color projection television (PTV) in widespread use today, a full color display is formed by superimposing three different (red, blue and green) monochrome images on a projection screen. While these monochrome images are usually formed using cathode ray tubes (CRT's), it has also been proposed to use active matrix electro-optic displays such as thin film transistor (TFT) switched twisted nematic liquid crystal displays (TN LCD) in place of the CRT's to generate these images.

In a TN LCD cell (sometimes referred to as a "light valve"), operating in the transmission mode, a liquid crystal (LC) material is sandwiched between two optically transparent walls, the inner surfaces of which each carry an orienting layer in contact with the LC, for promoting a preferential alignment of the LC molecules adjacent to the layers. Because the LC molecules also tend to align with one another, as well as with the orienting layers, a twist can be imparted to the LC by assembling the cell with a non-parallel orientation of these layers. For example, arranging the layers with their alignment directions orthogonal to one another produces a ninety degree twist of a nematic LC from one surface to the other. This twist enables the LC to rotate linearly polarized light by ninety degrees, so that the amount of light transmitted by the device can be controlled by an exit polarizer, called an analyzer. Furthermore, the LC can be untwisted by application of a voltage, so that, for example, light blocked by an analyzer having its polarization direction oriented orthogonally to that of an entrance polarizer, can be passed by application of an appropriate voltage to the LC cell.

A two-dimensional array of such cells, each cell individually addressable through a matrix of row and column electrodes, can be used to build up a display such as a video image, where each cell constitutes a pixel of information.

In one form of such an array, called an active matrix device, each pixel has an associated thin film transistor (TFT) switch, interconnecting the pixel with row and column electrodes. For example, the column electrode is connected to the source electrode of the TFT, the row electrode is connected to the gate electrode of the TFT, and the electrode defining the pixel is connected to the drain electrode of the TFT. In operation, the pixels are sequentially addressed, individually or row-by-row, through addressing signals supplied via the row electrodes, and during the addressing period the pixels are supplied with data signals via the column electrodes.

A disadvantage of such TFTs and certain other thin film switches is their sensitivity to light. Particularly under the large light flux to which the LCD's are subjected in a projection apparatus, this photosensitivity can result in significant current leakages through the switches.

In order to prevent this from happening, various arrangements have been proposed to shield the TFT's from incident light. For example, in U.S. Pat. No. 4,599,246, an opaque insulator film of, for example, germanium, is formed over the channel regions of the TFT's in an LCD array. In EPO 186 036, a light shielding layer of, for example, chromium is located behind an insulating layer adjacent the TFT's in an LCD array. In JA 63-41133, a thin film element for a display panel is sandwiched between light shielding layers of amorphous silicon-germanium or germanium. In JA 58-62622, a film of amorphous silicon covers the entire array of a liquid crystal display in order to shield the transistors from light, and also to reduce the chemical reaction between the liquid crystal and the metallic electrodes. This arrangement would only be suitable for an LCD operating in the reflective mode since the pixel electrodes are prevented from transmitting light by the placement of the protective layer.

In the other arrangements referred to, the light shielding layer is limited to the TFT's themselves, or even to the channel region of the TFT's, so that light cannot reach these areas directly. However, light may still reach these areas indirectly, for example, via scattering or reflection in the areas between the pixel electrodes (herein "interpixel areas").

OBJECTS AND SUMMARY OF THE INVENTION

It is an object of the invention to provide a thin film-switched active matrix electro-optic display device having a light shielding layer.

It is another object of the invention to provide such a display device with such a layer located in the interpixel area, to shield the thin film switches of the matrix from light which would otherwise be incident thereon, whether directly or indirectly, for example, through scattering or reflection in the interpixel areas.

It is another object of the invention to provide a color projection apparatus incorporating one or more of such active matrix electro-optic devices.

According to the invention, a thin film-switched active matrix electro-optic display device, having an array of pixel-defining electrodes associated with an array of thin film switches, column electrodes, and orthogonally related row electrodes, is provided with a light shielding layer in the area between the pixel-defining electrodes (herein "inter-pixel" area). Preferably, the light shielding layer is comprised of amorphous germanium or germanium nitride which, depending upon the electrical insulating requirements for the particular thin film device, may be isolated from the electrode array by a layer of dielectric material or even may be sandwiched between two layers of a dielectric material, for example, silicon oxide or silicon nitride.

In covering essentially the entire inter-pixel are a, the light shielding layer shields the thin film switches from light which would otherwise be incident thereon, whether directly or indirectly, such as through scattering or reflection in the inter-pixel areas. In addition, in preventing light from passing through the interpixel areas, the light shielding layer results in enhanced contrast of the resultant display image.

According to another aspect of the invention, a color projection apparatus incorporates one or more of such display devices with a light shielding layer. Preferably the apparatus is a color projection television, in which one display device provides an image for each of the separate red, blue and green channels of a television signal, and a full color display is formed by superimposing the three separate images on a projection screen.

DESCRIPTION OF THE PREFERRED EMBODIMENTS

Figure 1:
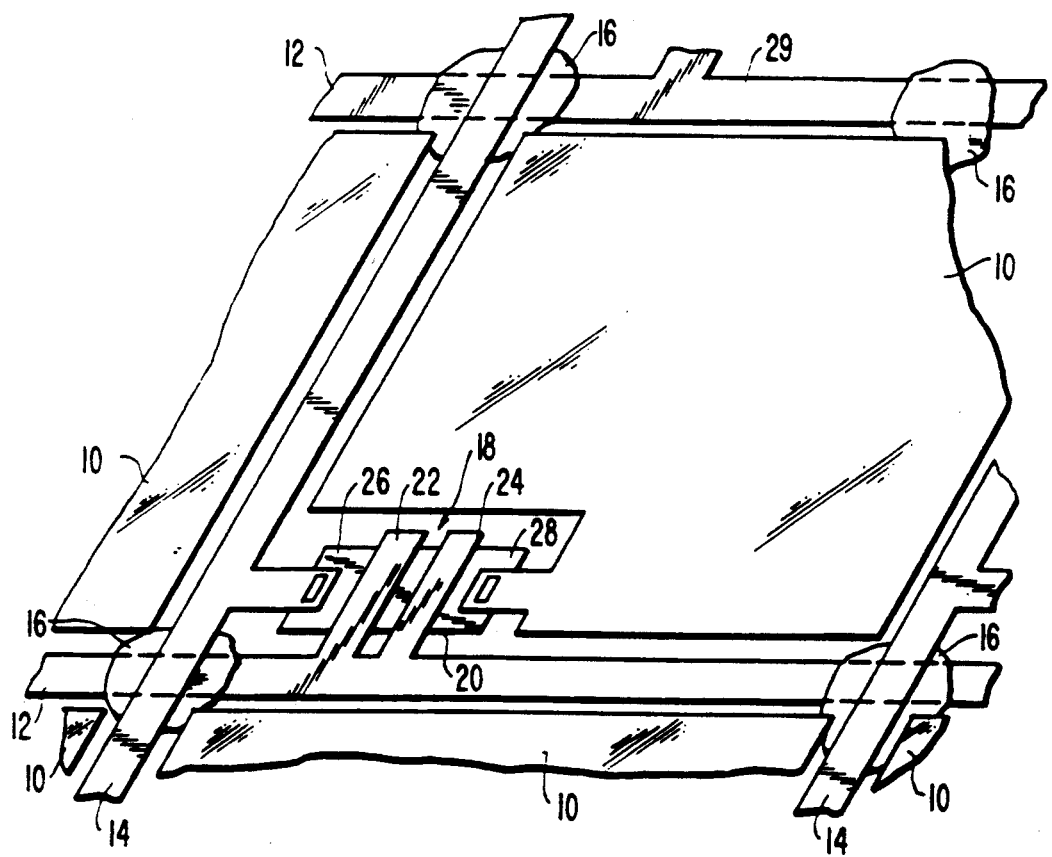
FIG. 1 is a diagrammatic perspective view of a portion of an active matrix TFT-switched LCD of the prior art.

FIG. 1 shows a portion of a prior art arrangement including a pixel and the surrounding area of an active matrix TFT-switched LCD for operation in the transmission mode, in which an array of thin transparent pixel electrodes 10, here of indium tin oxide (ITO), are arranged in a matrix of row and column electrodes 12 and 14, respectively, separated by a cross-over dielectric 16, here of chemically vapor deposited (CVD) oxide. Each pixel electrode 10 is accessed through a thin film switch such as a TFT 18 (only one of which is shown in the figure). The switch includes a polysilicon layer 20, one or more gate electrodes 22 and 24, which overlie channel regions (not shown in this figure) in layer 20 and which are connected to the polysilicon row electrode (also known as a gate line) 12, a gate dielectric under the gate electrodes (not shown in this figure), and source and drain regions 26 and 28, which are respectively connected to the aluminum column electrode (also known as a source line) 14 and to the pixel electrode 10.

Figure 2:
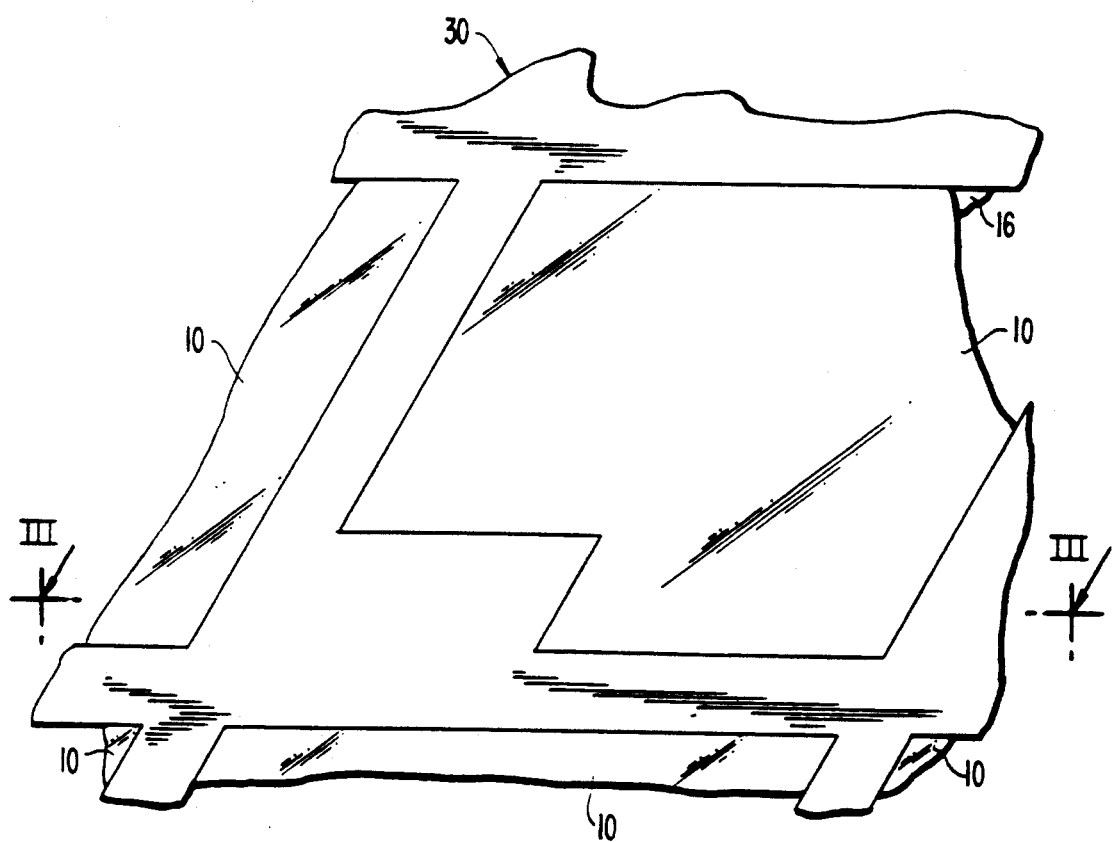
FIG. 2 is a diagrammatic perspective view similar to that of FIG. 1 showing such an LCD including a light shielding layer in the interpixel area according to the teachings of the invention.

FIG. 2 shows the arrangement of FIG. 1 in which a light shielding layer 30 has been added to the interpixel areas between the pixel electrodes 10. In covering not only the TFT 18, but also the areas surrounding it, the TFT is shielded not only from directly incident light, but also from reflected and/or scattered light coming for example, from areas between the pixel electrodes 10 and the column and data electrodes 14 and 12, respectively.

Figure 3:
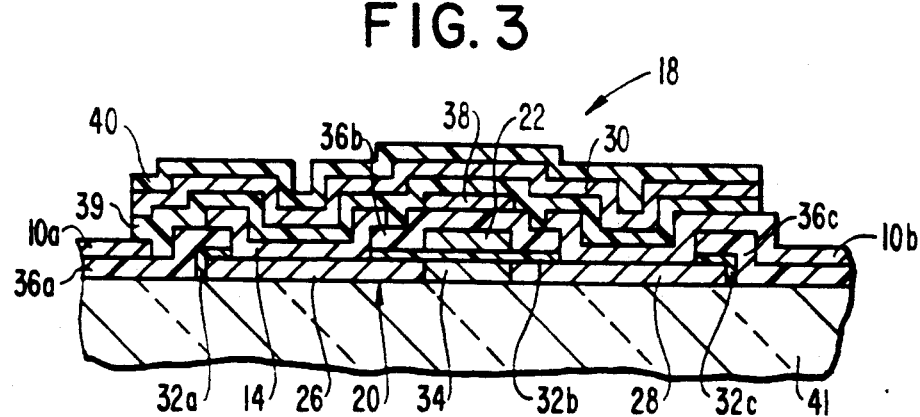
FIG. 3 is a diagrammatic cross-section along line II—II of the LCD of FIG. 2.

Referring now to FIG. 3 of the Drawing, there is shown in cross-section the TFT 18 and surrounding area along the line II—II of FIG. 2. TFT 18 is supported by a transparent substrate 41, which may be of a conventional glass composition, e.g., a silica-based glass. The TFT 18 includes a first poly layer 20, a thin thermal oxide layer 32 partly covering the first poly layer 20, and a conductive layer 22, such as a second poly layer, which has been doped with impurities to render it conductive. Source 26 and drain 28 regions in the first poly layer 20 have been formed by ion implantation through oxide layer 32, prior to patterning of layer 32 into portions 32a, b and c, using the conductive layer 22 as a self-aligning mask, in the known manner, to prevent implantation of dopants in channel region 34 between the source and drain regions 26 and 28.

Figure 6:
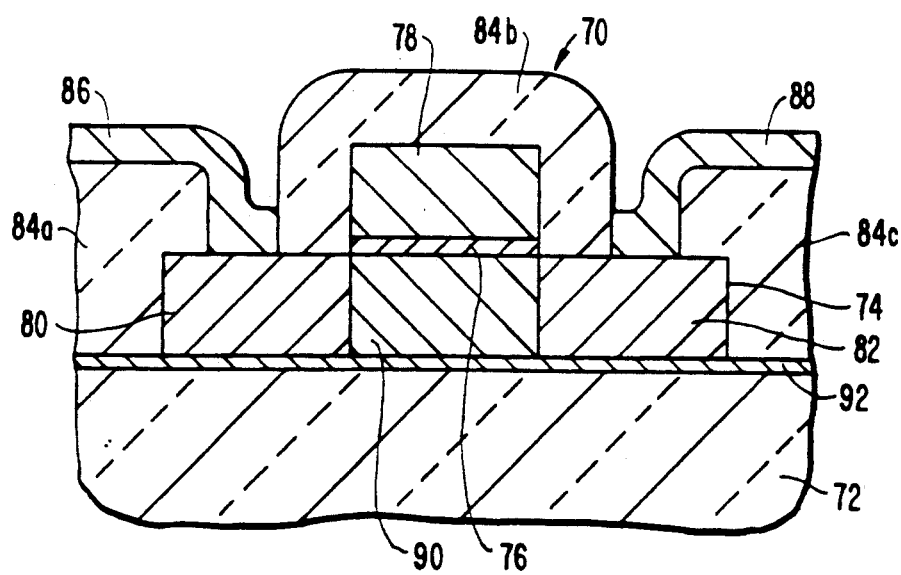
FIG. 6 is a cross-section of another embodiment of the TFT of the invention.

Layer 22 forms the gate electrode, and the portion 32b of oxide layer 32 which is under the electrode forms the gate dielectric of the device. In an alternative arrangement, shown in the TFT 70 of FIG. 6, the thermal oxide 76 has been patterned to lie only under the gate electrode 78.

Thin thermal oxide layer 32 is patterned into regions 32, 32b and 32c and thick LPCVD oxide layer 36 is patterned into regions 36a, b and c, to allow electrical contact to the source and drain regions 26 and 28 with contact metalizations which form the column and pixel electrodes 14 and 10. Contact of the row electrode 12 to the gate electrode 22 occurs in a different cross section of the device, and is thus not shown.

First poly layer 20 may be formed in the conventional manner by low pressure chemical vapor deposition (LPCVD) of silicon, formed by the vapor phase reaction of silane ($SiH_4$). Where an array of TFTs is desired, a thin film of poly is first deposited over the entire substrate, followed by patterning of the film to form an array of islands 20 using conventional photolithographic and etching techniques. Suitable etchants include the dry etchants HBr, $CCl_4$ and $SF_6$.

Next, the poly islands are oxidized to form the gate dielectric layer 32.

The poly to be oxidized may be in an as-deposited polycrystalline form, or may be recrystallized, e.g., to enhance grain growth and/or increase conduction speeds. Such recrystallization may be from the liquid or solid phase, and may follow amorphization (e.g., by silicon implantation) of the as-deposited polycrystalline layer.

The conductive layer for the gate electrode is conveniently provided as a second LPCVD poly layer having sufficient dopants to result in the desired degree of conductivity. As is known, these dopants may be provided during deposition of the layer, e.g., by the codeposition of phosphorus and silicon from phosphine ($PH_3$) and silane ($SiH_4$), respectively. Alternatively, the dopants may be provided in a subsequent ion implantation step. Patterning of the second poly layer into a gate electrode 22 is conveniently carried out using the same photolithographic and dry etching techniques used to form the poly islands.

The shaped gate electrode serves as a self-alignment mask in the formation of the source and drain regions 26 and 28, respectively, in the poly island by ion implantation on opposite sides of the gate. Phosphorus is implanted for n-channel devices and Boron is implanted for p-channel devices. Implant doses of $>10^{15}$ per square cm are typical.

Following formation of the source and drain regions, a thick insulating layer 36 is formed over the device, typically a CVD silicon oxide, often referred to as the low temperature oxide or LTO, to a thickness of about 0.5 to 1 micron.

At this stage, the device may be exposed to a hydrogen plasma ("plasma hydrogenated") in the known manner in order to passivate the grain boundaries of the poly layers, and to improve electrical performance.

The device is then annealed in nitrogen at a temperature of about 650 degrees C. for about 2 hours to activated th source and drain implants, after which contact vias are cut into the LTO and thermal oxide layers over the source, drain and gate electrodes, using photolithography and a wet etchant such as HF, and the device is metallized, e.g., by sputtering layers of aluminium and indium tin oxide (ITO) to form the electrodes, and then patterning the layers using photolithography and an appropriate etchant (e.g., a chlorine plasma for aluminium or dilute aqua regia for ITO).

During the aluminum metallization step to form the column electrode 14, an auxiliary light shielding layer 38 may optionally be formed over the gate electrode 22 on the LTO sublayer 36b, in order to augment the light shielding properties of the light shielding layer 30. This auxiliary light shielding layer 38 may prove advantageous in that it provides for a margin of error in the formation of light shielding layer 30 to a thickness adequate for the desired result, and may conveniently be formed without any additional masking or etching steps during the formation of column electrodes 14.

Layer 30 can be any material which adequately shields the TFT or other light-sensitive thin film switch from visible light (below 800 nm in wavelength) and which is compatible with the other LCD materials and processes. Layer 30 can be electrically conducting, if it is isolated from the electrode array by at least one dielectric layer, e.g. layer 39 in FIG. 3. However, even with such isolation, there is the possibility of shorts and/or capacitive coupling, leading to cross-talk among pixels, so that it is preferred to use a poorly conducting or insulating material for layer 30.

Especially preferred for layer 30 is amorphous germanium or germanium nitride ($GeN_x$), obtained by sputtering germanium in an inert or a nitrogen-containing atmosphere. In general, as the amount of N in the sputtering atmosphere increases, so the amount of N in the sputtered layer increases, resulting in increased electrical resistivity, and decreased optical transmission.

The amorphous character of the sputtered layer, as well as its resistivity, can be enhanced by maintaining a low substrate temperature, e.g. by employing a heat sink, by cooling, or simply by refraining from the normal practice of heating the substrate.

While the thickness of the layer will in general depend on the material used and the degree of light shielding desired, the thickness of the sputtered germanium or germanium nitride layer preferably ranges from 0.1 to 1 micron, below which the light shielding capability of the layer is not significant, and above which the steps formed in the layer (as the result of conforming to the multilayer film structure underneath), are of sufficient height to give rise to the possibility of "shadowing", i.e., causing discontinuities in the overlying orienting layer, when such layer is produced by the oblique deposition of SiO. Based on this consideration, when one or more isolating layers 39, 40 are employed with the light shielding layer 30, the total thickness of these layers should not exceed 1 micron.

Typical plasma deposition process parameters and results for silicon oxide and germanium deposition are given below:

| Process Parameters | Process Results |
|---|---|
| I. OXIDE DEPOSITION (CHEMICAL VAPOR DEPOSITION) | |
| Chemistry: | |
| 2% $SiH_4$ w/$N_2$ - 375 sccm | Dep Rate - 280 Å/min. |
| $N_2O$ - 850 sccm | Uniformity - < ±4% (across-the-wafer) |
| He - 1000 sccm | Uniformity - ±5% (wafer-to-wafer) |
| Power - 25 watts | Index of Refraction 1.47 |
| Frequency - 50 kHz | |
| Pressure - 700 mTorr | |
| II. GERMANIUM DEPOSITION (SPUTTERING) | |
| Gas - Argon | Dep Rate - 260 Å/min. |
| Pressure - 10 mTorr | Uniformity - ±10% (across-the-wafer) |
| Power - 200 watts | Resistivity ≈ 2.5 Mr/0 |
| DC Bias - −800 volts | Transmission Coeff. 0% |

The table below presents a range of process parameters and results for the plasma deposition of germanium nitride.

TABLE

| GERMANIUM NITRIDE LIGHT SHIELD+ | | | | | | |
|---|---|---|---|---|---|---|
| Sample No. | $N_2$/Ar | Power/Time w/min. | % Transmission @ 800 nm | % Transmission @ 700 nm | Thickness A | Resist. $\Omega(\times 10^5)$ |
| 1 | 0/100 | 100/30 | 61.5 | 69.0 | | 1.5 |
| 2 | 0/100 | 150/30 | 61.5 | 69.0 | | 1.0 |
| 3 | 0/100 | 200/30 | 73.5 | 46.0 | | 1.0 |
| 4 | 0/100 | 250/30 | 48.0 | 43.5 | | 0.67 |
| 5 | 0/100 | 300/30 | 58.5 | 34.0 | | 1.0 |
| 6 | 0/100 | 300/40 | 58.0 | 28.0 | | 10.0 |
| 7 | 50/50 | 300/30 | 53.0 | 30.0 | 6600 | |
| 8 | 82/18 | 200/30 | 26.0** | 16.0 | 4475 | |
| 9 | 82/18 | 250/30 | 27.0 | 10.7 | 5013 | 200.0 |
| 10-13 | 82/18 | 300/30 | 20.25* | 7.38* | 6988* | 200.0 |
| 14 | 82/18 | 300/40 | 9.0 | 2.0 | | |
| 15 | 82/18 | 350/30 | 9.2 | 2.0 | 7575 | 330.0 |
| 16 | 82/18 | 400/30 | 7.0 | 1.2 | 8350 | 270.0 |
| 17 | 90/10 | 300/30 | 1.0 | 0 | 7650 | 350.0 |

+The above data was taken with no anneal of the $GeN_x$ film.
*Average of four samples.
**Measurement taken at edge of layer.

It can be seen from the above Table that, in general, as the percentage of N in the sputtering atmosphere decreases from 100 to 10, the (sheet ?) resistance increases from $0.67 \times 10^5$ Ω (Sample 4) to $350 \times 10^5$ Ω (Sample 17), while the % transmission at 800 nm decreases from as high as 73.5% to 1%, and at 700 nm decreases from as high as 69% to zero.

The light shielding layer 30 and optional electrical isolating layers 39 and 40 are then patterned to extend not only over the TFT 18 but also over the adjacent interpixel areas between pixel electrodes 10a and 10b. Where the isolating layers 39 and 40 are used and the dielectric material is silicon oxide, the composite sandwich may be patterned in a single operation by plasma etching the layers first with $CHF_3$, which is selective for the oxide layers, then with $SF_6$, which is selective for germanium, and finally with $CHF_3$. Alternately, $CF_4$ may be used to etch germanium, or to etch all three layers, since it is not selective between germanium and silicon oxide.

Typical etching conditions and rates are given below:

| Process Parameters | Process Results |
|---|---|
| III. OXIDE ETCH | |
| Chemistry: | |
| $CHF_3$ - 40 sccm | Etch Rate - 325 Å/min. |
| $O_2$ - 2 sccm | Uniformity - ±5% |
| Power - 250 watts | Selectivity: |
| Frequency - 13.56 mHz | $SiO_2$:PR, 10:1 |
| DC Bias - 325 volts | $SiO_2$:Ge, 30:1 |
| Pressure - 50 mTorr | |
| IV. GERMANIUM ETCH USING $CF_u$ | |
| $CF_4$ - 40 sccm | Ge Etch Rate - 475 Å/min. |
| $O_2$ - 2 sccm | Uniformity - ±15% |
| $N_2$ - 250 sccm | Selectivity: |
| Power - 250 watts | Ge:$SiO_2$, 1:1 |
| Frequency - 13.56 mHz | Ge:PR, > 10:1 |
| DC Bias - 320 volts | |
| Pressure - 50 mTorr | |
| V. GERMANIUM ETCH USING $SF_6$ | |
| $SF_6$ - 25 sccm | Etch Rate - 1080 Å/min. |
| $N_2$ - 500 sccm | Uniformity - ±10% |
| Power - 100 watts | Selectivity: |
| Frequency - 13.56 mHz | Ge:$SiO_2$, 12:1 |
| DC Bias - 140 volts | Ge:PR, 3:1 |
| Pressure - 50 mTorr | |

Figure 7:
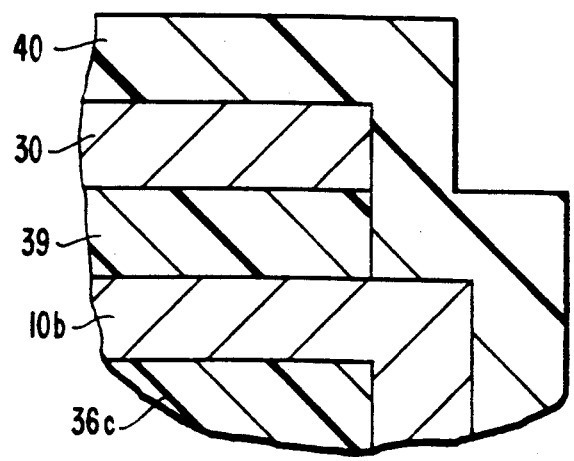
FIG. 7 is a portion of another cross-section similar to that of FIG. 3, showing yet another embodiment of the invention.

In patterning light shielding layer 30, exact registration between the edges of this layer and the edges of the pixel electrodes in unnecessary, since fringing fields at the edges of the pixel electrodes result in the active region being extended laterally by about 1 to 2 microns beyond these edges. Taking advantage of this tolerance range also reduces the risk of capacitive coupling due to overlap of the layer 30 with the pixel electrodes 10

Where two isolating layers 39 and 40 are used, the edges of the layer 30, exposed during pattering by etching may be covered by layer 40. This is accomplished by delaying deposition of layer 40 until after patterning of layers 39 and 30, so that such deposition results in a stepped coverage of the edges, as shown in FIG. 7. However, an extra masking and etching step may then be needed to pattern layer 40.

Figure 4:
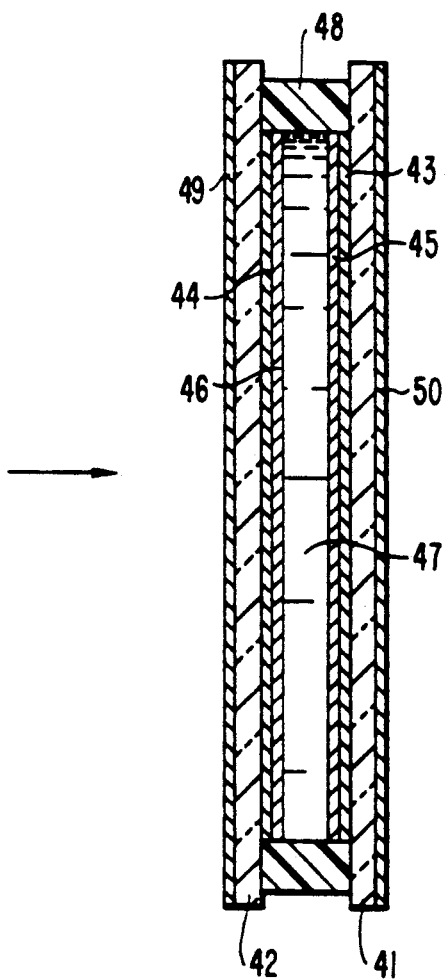
FIG. 4 is a diagrammatic cross-section of an entire LCD of the type shown in FIGS. 1 and 2.

A cross-section of an entire active matrix LCD of the type shown in FIGS. 1 and 2 is shown in FIG. 4. Of two glass supporting plates 41 and 42, the supporting plate 41 carries on its inner surface a pattern of row and column electrodes, and an array of pixel electrodes and associated TFTs, illustrated schematically as layer 43. Supporting plate 42 carries a transparent counter electrode 44. Orienting layers 45 and 46 are present on the inner surfaces of the layer 43 and the counter electrode 44, these orienting layers formed for example by vapor deposition of silicon oxide (SiO) at an oblique angle to the normal of the surfaces. A nematic liquid crystal material 47, such as the proprietary formulation known as ZLI 84-460, manufactured by E. Merck of Darmstadt, West Germany, containing a chiral addition of, for example, n cyano 4'-(2-methyl)-isobutyl-biphenyl (obtainable as CB15 from DBH Chemicals, Poole, England), is present between the supporting plates. The spacing between the plates is typically about 6 to 8 microns and is maintained by spacer beads which are distributed regularly over the surfaces of the plates, and are not shown in the drawing. A sealing edge 48 joins the plates together at their circumference. As a result of the obliquely vapor deposited silicon oxide layers, the liquid crystal molecules undergo a rotation of approximately 90° over the cell thickness. The chiral additive determines the direction of twist of the liquid crystal molecules, CB15 imparting a counter clockwise twist.

The outer surfaces of the supporting plates 41 and 42 furthermore each carry a linear polarizer. Polarizer 49 intercepts the incident light indicated by the arrow in the drawing, and analyzer 50 intercepts the light transmitted by the device.

The display cell can be switched from a first stable state to a second stable state differing optically from the first by driving the electrodes in a suitable known manner. With a parallel orientation of polarizer and analyzer, a selected display cell or pixel in the off-state (no voltage applied) will be dark (light absorbing). By rotating one of the polarizers 90° with respect to the other, (crossed orientation) a white (light transmitting) off-state can be achieved.

Figure 5:
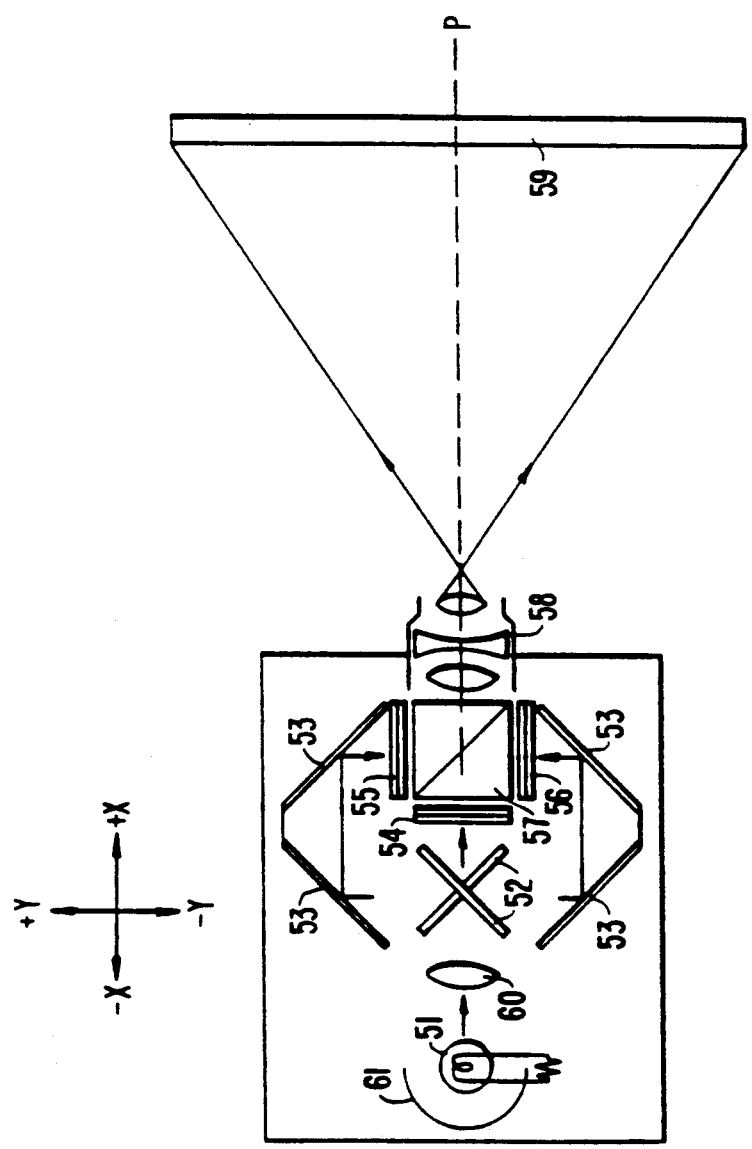
FIG. 5 is a diagrammatic plan view of one embodiment of an LCD color PTV system employing three LCD's of the invention.

Referring now to FIG. 5, there is shown a diagrammatic representation of an LCD color PTV system employing a front projection screen. In the arrangement shown, light from a tungsten halogen lamp 51 is variously transmitted and reflected through a cross pair of dichroic mirrors 52 and adjacent mirrors 53 to pass through three active matrix TFT switched LCDs 54, 55 and 56. These three LCDs, acting as light valves in the transmissive mode, modulate three channels to create the red, green and blue portions of a TV picture. The dichroic mirrors 52 break the white light from source 51 into red, blue and green portions of the spectrum. These three color portions are then recombined by way of a dichroic prism 57. The recombined light is projected by way a projection lens 58 along a projection axis P to a projection screen 59.

This arrangement also includes a condenser arrangement consisting of a condenser lens 60 and a reflector 61. Condenser lens 60 is designed for maximum collection efficiency to collect light emitted in the $+X$ direction. The spherical reflector 61 collects light emitted in the $-X$ direction and images the light of the lamp back onto itself.

The invention has been described in terms of a limited number of embodiments. Other embodiments within the scope of the invention and the appended claims are contemplated. For example, the light shielding layer need not be amorphous germanium or germanium nitride, but may be any material which attenuates incident light to an effective degree. The dielectric isolating layers may be silicon nitride formed, for example, by plasma or chemical vapor deposition. The pixels of the array need not be switched by a three terminal device such as a thin film transistor, but may also be switched by a two terminal device, for example, a non-linear switch such as a diode or MIM. In addition, the electro-optic medium need not be a nematic liquid crystal, but could be another liquid crystal material such as a super twist liquid crystal, or another electro-optic material such as a ferro-electric or electro-luminescent material. Furthermore, the display device need not be a light valve operating in the transmissive mode, but could also operate in the reflective mode.

We claim:

1. An active matrix electro-optic display device comprising a pair of facing, spaced-apart walls having inner and outer surfaces, at least one of which walls is optically transparent, an array of pixel electrodes, an interpixel area surrounding the pixel electrodes, an array of TFT switches associated with the pixel electrodes, and an array of orthogonally related row and column electrodes interconnecting the array of pixel electrodes and switches, the arrays arranged on the inner surface of one of the walls, a counter electrode on the inner surface of the other wall, orienting layers overlying the arrays and the counter electrode on the walls, and a liquid crystal material filling the space between the walls and contacting the orienting layers, characterized in that the display includes a layer of light shield material in the interpixel area, the layer comprising amorphous germanium and having a thickness of from 0.1 to 1.0 microns, and further characterized in that a layer of dielectric material is located between the layer of light shielding material and the electrode array.

2. The display device of claim 1 in which the light shielding layer is sandwiched between two layers of dielectric material.

3. The display device of claim 2 in which one of the layers of dielectric material covers at least part of an edge of the light shielding layer.

4. The display device of claim 1 in which the dielectric material is silicon dioxide.

5. The display device of claim 1 in which an auxiliary light shielding layer is located above the TFT gate electrodes.

6. The display device of claim 1 in which the total thickness of the light shielding and dielectric layers does not exceed 1 micron in thickness.

7. A color projection apparatus including:
three electro-optic display devices each comprising a pair of facing, spaced apart walls having inner and outer surfaces, at least one of which walls is optically transparent, an array of pixel electrodes, an interpixel area surrounding the pixel electrodes, an array of TFT switches associated with the pixel electrodes, and an array of orthogonally related row and column electrodes interconnecting the array of switches and pixel electrodes, the arrays arranged on the inner surface of one of the walls, a counter electrode on the inner surface of the other wall, orienting layers overlying the arrays and the counter electrode on the walls, and a liquid crystal material filling the space between the walls and contacting the orienting layers;

means for creating separate monochrome components of a color image, each corresponding to one of the three primary colors red, blue and green, on the display devices;

a projection screen;

and means for projecting the image components onto the screen to form a full color display, characterized in that at least one of the display devices includes a light shielding layer in the interpixel area, the layer comprising amorphous germanium and having a thickness of from 0.1 to 1.0 microns, and further characterized in that a layer of dielectric material is located between the layer of light shielding material and the electrode array.

8. The apparatus of claim 7 in which the light shielding layer is sandwiched between two layers of dielectric material.

9. The apparatus of claim 7 in which the dielectric material is silicon dioxide.

10. The apparatus of claim 7 in which an auxiliary light shielding layer is located above the TFT gate electrodes.

11. The apparatus of claim 7 in which the total thickness of the light shielding and dielectric layers does not exceed 1 micron in thickness.

* * * * *